United States Patent
Field

[11] Patent Number: 5,144,795
[45] Date of Patent: Sep. 8, 1992

[54] FLUID COOLED HOT DUCT LINER STRUCTURE

[75] Inventor: Robert E. Field, Tequesta, Fla.

[73] Assignee: The United States of America as represented by the Secretary of the Air Force, Washington, D.C.

[21] Appl. No.: 700,369

[22] Filed: May 14, 1991

[51] Int. Cl.⁵ .......................... F02K 3/02; B64D 33/04
[52] U.S. Cl. ..................................... 60/226.1; 60/261; 60/754; 239/127.3
[58] Field of Search ...................... 60/226.1, 261, 266, 60/752, 754, 755; 239/127.1, 127.3

[56] References Cited

U.S. PATENT DOCUMENTS

| | | | |
|---|---|---|---|
| 2,794,319 | 6/1957 | Stockdale | 60/261 |
| 2,938,333 | 5/1960 | Wetzler | 60/261 |
| 3,041,836 | 7/1962 | Truman et al. | 60/261 |
| 3,440,820 | 4/1969 | Caveny | 60/266 |
| 3,467,312 | 9/1969 | Mehr | 239/127.3 |
| 3,848,697 | 11/1974 | Jannot et al. | 239/127.3 |
| 3,978,662 | 9/1976 | DuBell et al. | 60/39.65 |
| 4,392,355 | 7/1983 | Verdouw | 60/752 |
| 4,414,816 | 11/1983 | Craig et al. | 60/757 |
| 4,614,082 | 9/1986 | Sterman et al. | 60/39.32 |
| 4,700,544 | 10/1987 | Fucci | 60/757 |
| 4,800,718 | 1/1989 | Zimmerman | 60/264 |
| 4,833,881 | 5/1989 | Vdoviak et al. | 60/261 |
| 4,887,663 | 12/1989 | Auxier et al. | 165/47 |
| 4,934,145 | 6/1990 | Zeisser | 60/756 |
| 4,944,151 | 7/1990 | Hovnanian | 60/39.32 |
| 5,056,307 | 10/1991 | Liang | 60/226.1 |
| 5,069,034 | 12/1991 | Jourdain et al. | 60/261 |

Primary Examiner—Richard A. Bertsch
Assistant Examiner—Howard R. Richman
Attorney, Agent, or Firm—Bobby D. Scearce; Donald J. Singer

[57] ABSTRACT

Liner structure for a duct carrying a heated fluid is described which comprises a substantially cylindrically shaped wall member having a corrugated inner surface contour defining a first plurality of axially extending ridges defined between a corresponding plurality of axial grooves, a second plurality of axially spaced vee-shaped vanes disposed on each ridge with the legs of each vane divergent toward the downstream end of the duct, an elongated cap disposed along each ridge atop corresponding vanes and defining a corresponding plurality of slots between each cap and ridge, and a third plurality of holes through the wall member at each ridge between axially adjacent vanes for conducting fluid coolant through the wall member.

8 Claims, 2 Drawing Sheets

FLUID COOLED HOT DUCT LINER STRUCTURE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to structures for cooling the surface defining a duct for conducting a heated fluid, such as the exhaust duct liner of a gas turbine engine.

One of the major difficulties in the design of combustion chambers for ramjet, turbojet and rocket motors exposed to the hot mainstream gas is the severe and uneven heating of gas path surfaces resulting in hot streaks and transverse/longitudinal variations in the radiant and convective heat loads. Cooling system structures for liners must be carefully designed to successfully cool the liners under widely varying heat transfer conditions characteristic of hot engine operation. Efficient use of air film cooling is dependent on the method used to inject air into the hot gas mainstream, i.e., the air must form a continuous cool film over the surfaces where protection from the hot mainstream is desired, and must experience minimum mixing with the mainstream in order to maximize the axial extent of liner cooling.

It is therefore a principal object of the invention to provide structure for cooling a duct carrying a heated fluid.

It is a further object of the invention to provide structure for cooling the exhaust duct of a gas turbine engine.

It is a yet another object of the invention to provide structure for cooling a gas turbine engine exhaust duct liner by the injection of a coolant film of air.

These and other objects of the invention will become apparent as a detailed description of representative embodiments proceeds.

SUMMARY OF THE INVENTION

In accordance with the foregoing principles and objects of the invention, liner structure for a duct carrying a heated fluid is described which comprises a substantially cylindrically shaped wall member having a corrugated inner surface contour defining a first plurality of axially extending ridges defined between a corresponding plurality of axial grooves, a second plurality of axially spaced vee-shaped vanes disposed on each ridge with the legs of each vane divergent toward the downstream end of the duct, an elongated cap disposed along each ridge atop corresponding vanes and defining a corresponding plurality of slots between each cap and ridge, and a third plurality of holes through the wall member at each ridge between axially adjacent vanes for conducting fluid coolant through the wall member.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
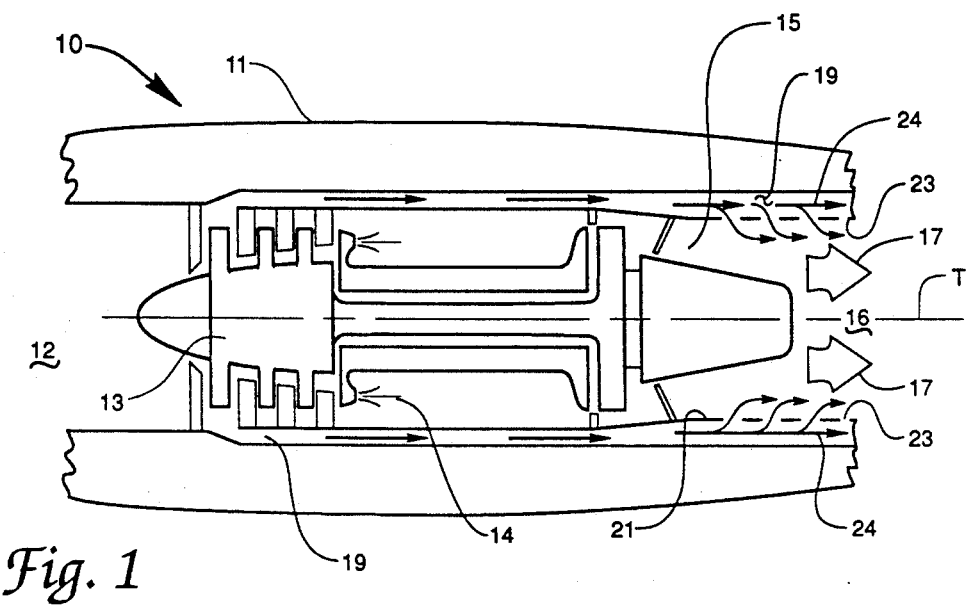
FIG. 1 shows a schematic cross section of a gas turbine engine having an exhaust duct liner which may be cooled using structure of the invention.

Referring now to the drawings, FIG. 1 shows a schematic axial cross section of a gas turbine engine 10 having an exhaust duct liner which may be cooled by incorporating the structure of the invention. Engine 10 typically is supported within structure 11 and includes air inlet and diffuser region 12 for ingesting ambient air, compressor region 13, combustor region 14, afterburner region 15 and discharge or exhaust duct 16. During operation of engine 10, stream 17 of high temperature gaseous combustion products is discharged rearwardly along thrust axis T in providing thrust to the vehicle carried by engine 10.

In order to provide effective cooling to the liner structure defining exhaust duct 16, structure 11 may include an annularly shaped duct 19 defined by supporting structure 11 and liner 21 defining exhaust duct 16. In the operation of engine 10, high temperature gaseous combustion products in stream 17 render necessary that means be provided to cool liner 21. Accordingly, duct 19 may communicate with compressor region 13 or with inlet 12 to provide a source of rearwardly flowing unheated air to act as coolant for liner 21. Means in the prior art include slots or holes or the like in liner 21 or other means 23 for admitting coolant air 24 from duct 19 to provide a layer of relatively cool air flowing across the inner surface of liner 21 without substantially affecting operation of engine 10. In prior art structures means 23 may comprise a multiplicity of holes in liner 21, and coatings may be applied on the inner surface of liner 21 to promote cooling of the liner. Air flowing within duct 19 which is not ingested into duct 16 may typically be used to cool the outer surfaces of liner 21 and may be exhausted conventionally by means (not shown) rearward of engine 10.

Referring now to FIGS. 2-5, shown therein are representative structures for cooling liner 21 according to the invention. In accordance with a principal feature of the invention, and with reference first to FIG. 2, liner 21' is generally tubular with an inner surface of generally corrugated shape comprising a plurality of grooves 27 defined between a corresponding plurality of axially extending ridges 29. Each ridge 29 may have cross-sectional shape 31 substantially defining a catenary in a generally preferred structure. In typical engines 10 in which exhaust duct 16 is sized to have a diameter in the range from about 10 to 60 inches, about 15 to 80 ridges 29 will preferably be defined in liner 21' around the circumference thereof and generally serve the intended function of the invention as discussed more fully below. The perpendicular distance d between the tip of each ridge 29 and the bottom of an adjacent groove 27 will ordinarily be about 1 to 3 inches, or about 5 to 10 percent of the diameter of liner 21'.

Figure 2:
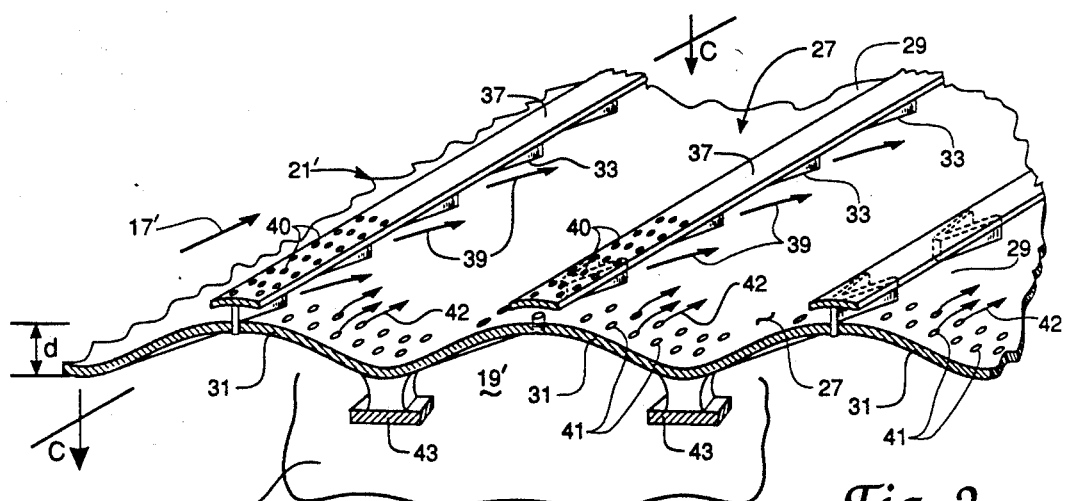
FIG. 2 is a view of a section of exhaust duct showing one representative liner structure according to the invention.
Figure 3:
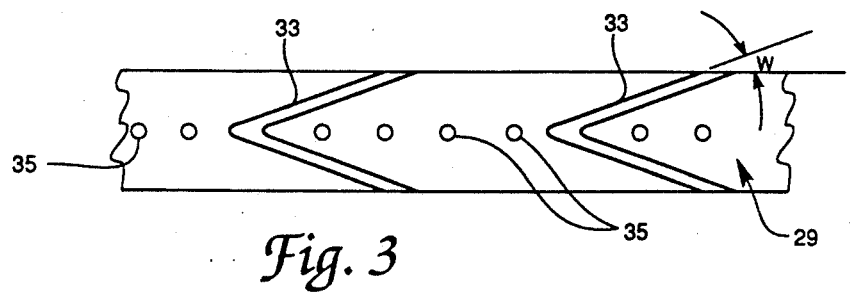
FIG. 3 is a plan view of the coolant holes and deflector vanes of the FIG. 2 structure.

Referring now additionally to FIG. 3, shown therein is a view of the FIG. 2 structure taken along lines C—C showing a plan view of a ridge 29. A plurality of axially spaced coolant deflector vanes 33 are disposed on each ridge 29 as suggested in FIGS. 2 and 3. Vanes 33 are vee-shaped with the legs of the vee diverging in the downstream direction of stream 17'. The number of vanes 33 disposed on each ridge 29 and the angle of divergence w of the legs thereof may be selected according to the size and number of corrugations defining the structure of liner 21'. Useful structure according to the invention will preferably include about 6 to 24 vanes per foot of axial extent of liner 21', with overall length of each vane of about 0.5 to 4 inches and an angle of divergence w of about 20° to 45°. A small plurality (about 3 to 6) of spaced coolant supply holes 35 are defined in each ridge 29 between axially successive vanes 33 to admit flow of coolant air from duct 19'. An elongated, accurately shaped ridge cap 37 is disposed along and in spaced relationship to each ridge 29 atop corresponding vanes 33 and coolant supply holes 35 for deflecting flow 39 of coolant air in cooperation with vanes 33. Ridge caps 37 may normally comprise the same material that comprises liner 21' and may measure about 0.5 to 3 inches in width and may be spaced about 0.02 to 0.5 inch from ridges 29, depending on the size of liner 21'. As coolant air is admitted through holes 35 (usually under pressure), it impinges on the underside of each ridge cap 37 and spreads from between successive vanes 33 to form flow 39 exiting along the surface of liner 21' with a first flow velocity component in the direction of stream 17' and a second flow velocity component tangentially down the sides of each ridge 29. The corrugated surface curvature of liner 21' retards turbulent mixing processes as coolant air is carried downstream by viscous interaction with stream 17'.

Further holes 40 may be defined in ridge cap 37 at preselected spaced intervals along the length thereof for cooling local hot spots in ridge cap 37. A plurality of coolant holes 41 may be defined around the circumference of liner 21' near an upstream end thereof as suggested in FIG. 2 in order to establish a coolant boundary layer 42 along the surface of liner 21'. It is noted that a second or further pluralities of coolant holes 41 may also be defined at axially spaced positions along the surface of liner 21' if desired to ensure maintenance of a coolant boundary layer 42 along the surface of liner 21'.

Any required number of connecting lugs 43 provide means for attaching liner 21' in spaced relationship to supporting structure 11 of engine 10 and for defining duct 19'.

Figure 4:
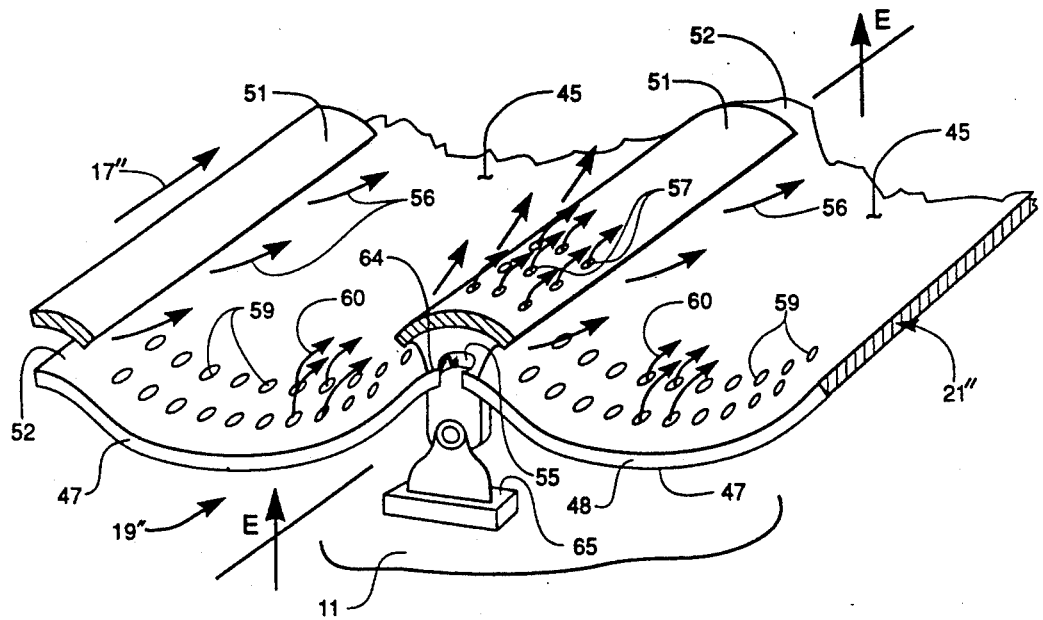
FIG. 4 is a view of a section of exhaust duct showing a second representative liner structure according to the invention.
Figure 5:
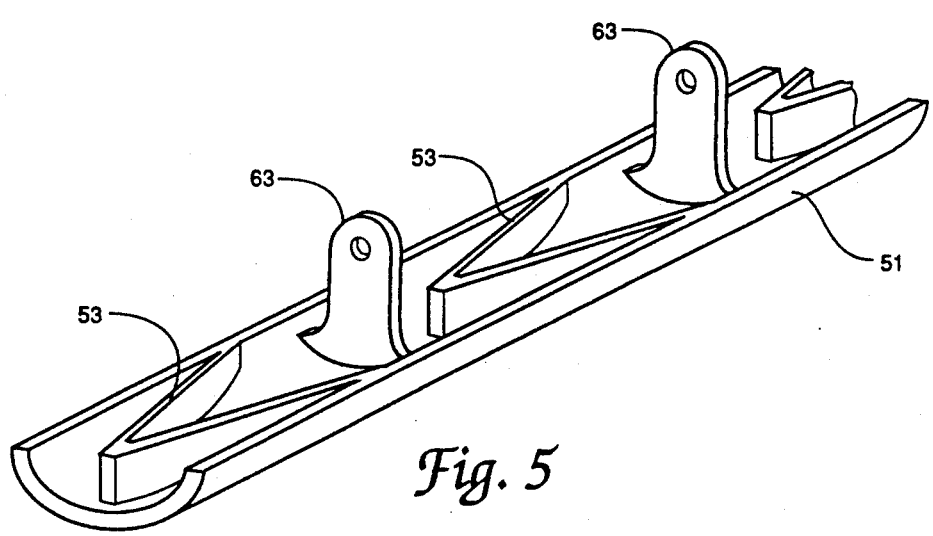
FIG. 5 shows the ridge cap detail for the FIG. 4 structure.

Referring now to FIGS. 4 and 5, shown therein is a structure of the invention alternative to that of FIGS. 2 and 3. In FIG. 4, liner 21" of the invention is formed of a plurality of channels 45 defined by a corresponding plurality of axially extending adjacent curved sections 47. Each section 47 may have cross-sectional shape 48 substantially defining an inverted catenary. The number of sections 47 comprising liner 21" is substantially the same as that of ridges 29 of liner 21. of FIG. 2.

Referring now additionally to FIG. 5, shown is a view taken along lines E—E of FIG. 4 showing the underside of elongated accurately shaped ridge cap 51 disposed axially along and in spaced relationship to each rounded juncture 52 of adjacent sections 47. A plurality of vanes 53 similar in structure and function to that of vanes 33 of the FIG. 2 structure are disposed axially along each juncture 52 beneath each ridge cap 51. The number and spacing of vanes 53 may be substantially the same as that for vanes 33 of FIG. 2. Coolant supply holes 55 along juncture 52 upstream of each vane 53 provide for coolant flow 56 along the surface of liner 21" in manner similar to that described above for coolant flow 39. Additional coolant supply holes 57 in ridge cap 51 provide cooling of local hot spots in ridge cap 51 and coolant holes 59 in liner 21" function to establish a coolant boundary layer 60 in manner substantially identical to similarly named elements of the FIG. 2 and 3 embodiment.

In the FIG. 4 structure, the tangential velocity component spreads flow 56 over the surface of liner 21", and the concave (catenary) shape continuously compresses and holds together the coolant layer, and retards turbulent mixing processes as the coolant is carried downstream with stream 17".

Lugs 63 attached to ridge caps 51 may extend through corresponding slots 64 in liner 21" for attachment to brackets 65 to Provide means to attach liner 21" to structure 11 and otherwise to define duct 19".

The structures defined by the invention allow injection of coolant into the low velocity area of the wall boundary layer. If included, coolant supply holes 41 or 59 may serve to establish a boundary layer to separate the mainstream flow from the surface of the liner along the upstream end of the liner and, once established, is maintained by coolant flow patterns established at the ridge caps. Protective coatings may be used on exposed surfaces without substantially affecting coolant flow at critical cooling areas of the liner.

The invention therefore provides improved structures for cooling the surface defining a duct for conducting heated gases, such as an exhaust duct of a gas turbine engine. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A liner structure for a hot gas duct in a gas turbine engine or the like comprising:
   (a) a generally tubular shaped wall member defining a duct for conducting hot gas from an upstream end to a downstream end along a central axis thereof;
   (b) said wall member having an inner surface of generally corrugated contour defining a first plurality of axially extending ridges defined between a corresponding plurality of axially extending grooves;
   (c) a second plurality of axially spaced vee-shaped vanes disposed on each said ridge, each said vane having a pair of legs divergent toward the downstream end of said duct;
   (d) an elongated cap disposed along each said ridge atop corresponding said vanes, said cap and corresponding vanes defining a corresponding plurality of slots between said cap and ridge; and
   (e) means defining a third plurality of holes through said wall member at each said ridge and between axially adjacent vanes for conducting fluid coolant through said wall member.

2. The liner structure of claim 1 wherein said generally corrugated contour defines 15 to 80 axially extending ridges.

3. The liner structure of claim 1 further comprising means defining a fourth plurality of holes through said wall member around the circumference thereof and near the upstream end thereof.

4. The liner structure of claim 1 wherein the cross sectional shape of each said ridge defines substantially a catenary.

5. A liner structure for a hot gas duct in a gas turbine engine or the like, comprising:
   (a) substantially coaxial inner and outer wall members having respective upstream and downstream ends and defining a substantially annular plenum therebetween, said plenum having an inlet near an upstream end thereof for admitting coolant fluid into said plenum, said inner wall member defining a duct for conducting hot gas from the upstream end to the downstream end along a central axis thereof;
   (b) said inner wall member having an inner surface of generally corrugated contour defining a first plurality of axially extending ridges defined between a corresponding plurality of axially extending grooves;
   (c) a second plurality of axially spaced vee-shaped vanes disposed on each said ridge, each said vane having a pair of legs divergent toward the downstream end of said duct;
   (d) an elongated cap disposed along each said ridge atop corresponding said vanes, said cap and corresponding vanes defining a corresponding plurality of slots between said cap and ridge; and
   (e) means defining a third plurality of holes through said inner wall member at each said ridge and between axially adjacent vanes for conducting fluid coolant from said plenum through said inner wall member.

6. The liner structure of claim 5 wherein said generally corrugated contour defines 15 to 80 axially extending ridges.

7. The liner structure of claim 5 further comprising means defining a fourth plurality of holes through said inner wall member around the circumference thereof and near the upstream end thereof.

8. The liner structure of claim 5 wherein the cross sectional shape of each said ridge defines substantially a catenary.

* * * * *